US006991290B1

(12) United States Patent
Wiertzema

(10) Patent No.: US 6,991,290 B1
(45) Date of Patent: Jan. 31, 2006

(54) MOTORCYCLE BACKREST SYSTEM

(76) Inventor: Vance Wiertzema, 1960 390th St., Breckenridge, MN (US) 56520

( * ) Notice: Subject to any disclaimer, the term of this patent is extended or adjusted under 35 U.S.C. 154(b) by 0 days.

(21) Appl. No.: 10/817,005

(22) Filed: Mar. 31, 2004

(51) Int. Cl.
*A47C 7/02* (2006.01)

(52) U.S. Cl. .............. 297/230.1; 297/352; 297/215.11; 280/304.4; 280/288.4

(58) Field of Classification Search ...... 297/230.1 OR, 297/353, 352 X, 452.18, 215.11 X, 215.12; 280/304.4, 288.4
See application file for complete search history.

(56) References Cited

U.S. PATENT DOCUMENTS

| | | | | | |
|---|---|---|---|---|---|
| 4,030,750 | A * | 6/1977 | Abram | 297/375 |
| 4,186,937 | A | 2/1980 | Schultz | 280/289 |
| 4,313,639 | A | 2/1982 | Ware | 297/366 |
| D271,866 | S * | 12/1983 | Turkington et al. | D12/119 |
| 4,466,660 | A | 8/1984 | Mabie | 297/195 |
| 4,570,998 | A | 2/1986 | Hughes | 297/353 |
| D371,529 | S * | 7/1996 | Potter | D12/114 |
| 5,544,937 | A | 8/1996 | Hanagan | 297/215.12 |
| 5,667,232 | A * | 9/1997 | Gogan et al. | 280/202 |
| 6,007,150 | A | 12/1999 | Clerkin et al. | 297/215.12 |
| 6,422,648 | B1 | 7/2002 | Hanagan | 297/215.12 |
| 6,655,740 | B1 | 12/2003 | Hanagan | 297/352 |
| 2003/0205919 | A1 | 11/2003 | Hanagan | 297/215.12 |

* cited by examiner

*Primary Examiner*—Laurie K. Cranmer

(57) ABSTRACT

A motorcycle backrest system for providing a removable backrest for a motorcycle. The motorcycle backrest system includes a backrest, a pair of front legs extending downwardly from the backrest, a pair of receiver members attachable to a motorcycle for receiving the lower ends of the front legs and a pair of rear legs extending from the front legs at an angle. Each of the rear legs includes an engaging end formed to catchably receive a corresponding pair of spacer members attached to the motorcycle.

15 Claims, 11 Drawing Sheets

MOTORCYCLE BACKREST SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to motorcycle seats and backrests and more specifically it relates to a motorcycle backrest system for providing a removable backrest for a motorcycle.

2. Description of the Related Art

Motorcycle backrests have been in use for years. The backrest extends upwardly from the base portion of the seat and allows the rider of the motorcycle to lean rewardly against to increase their comfort while riding the motorcycle.

A problem with conventional motorcycle backrests is that they are permanently attached to the motorcycle. A problem with conventional motorcycle seats is that they often times do not include a backrest and require the purchase of a completely new seat with an integral backrest.

While these devices may be suitable for the particular purpose to which they address, they are not as suitable for providing a removable backrest for a motorcycle. Conventional motorcycles either do not have removable driver backrests or they require the purchase of a new seat to have a drive backrest.

In these respects, the motorcycle backrest system according to the present invention substantially departs from the conventional concepts and designs of the prior art, and in so doing provides an apparatus primarily developed for the purpose of providing a removable backrest for a motorcycle.

BRIEF SUMMARY OF THE INVENTION

In view of the foregoing disadvantages inherent in the known types of backrests now present in the prior art, the present invention provides a new motorcycle backrest system construction wherein the same can be utilized for providing a removable backrest for a motorcycle.

The general purpose of the present invention, which will be described subsequently in greater detail, is to provide a new motorcycle backrest system that has many of the advantages of the backrests mentioned heretofore and many novel features that result in a new motorcycle backrest system which is not anticipated, rendered obvious, suggested, or even implied by any of the prior art backrests, either alone or in any combination thereof.

To attain this, the present invention generally comprises a backrest, a pair of front legs extending downwardly from the backrest, a pair of receiver members attachable to a motorcycle for receiving the lower ends of the front legs and a pair of rear legs extending from the front legs at an angle. Each of the rear legs includes an engaging end formed to catchably receive a corresponding pair of spacer members attached to the motorcycle.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a motorcycle backrest system that will overcome the shortcomings of the prior art devices.

A second object is to provide a motorcycle backrest system for providing a removable backrest for a motorcycle.

Another object is to provide a motorcycle backrest system that may be efficiently attached and removed from a motorcycle.

An additional object is to provide a motorcycle backrest system that may be utilized upon various brands and models of motorcycles.

A further object is to provide a motorcycle backrest system that provides a removable driver backrest.

Another object is to provide a motorcycle backrest system that eliminates the need to purchase a new seat to have a driver backrest.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
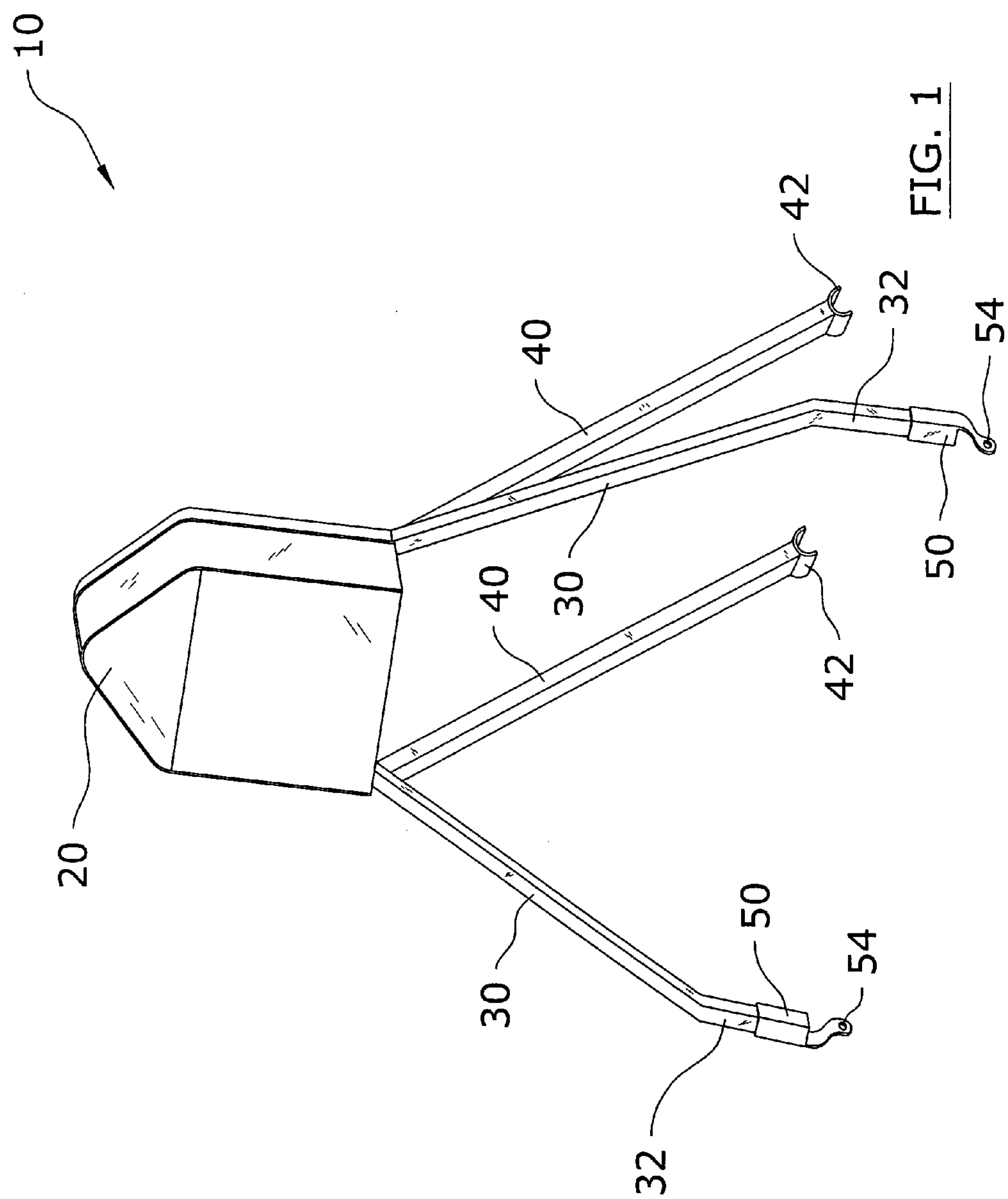
FIG. 1 is an upper perspective view of the present invention.

Turning now descriptively to the drawings, in which similar reference characters denote similar elements throughout the several views, FIGS. 1 through 11 illustrate a motorcycle backrest system 10, which comprises a backrest 20, a pair of front legs 30 extending downwardly from the backrest 20, a pair of receiver members 50 attachable to a motorcycle 12 for receiving the lower ends of the front legs 30 and a pair of rear legs 40 extending from the front legs 30 at an angle. Each of the rear legs 40 includes an engaging end formed to catchably receive a corresponding pair of spacer members 14 attached to the motorcycle 12.

B. Backrest

An exemplary backrest 20 is illustrated in FIGS. 1 through 6 of the drawings. The backrest 20 may have various other shapes, styles and sizes as can be appreciated by one skilled in the art. For example, the backrest 20 may be padded or non-padded. The backrest 20 may be comprised of various materials such as but not limited to leather, vinyl, cloth and the like.

C. Frame

The frame is attached to and supporting the backrest 20 as shown in FIGS. 1 through 6 of the drawings. The frame is removably attachable to the motorcycle 12 in order to position the backrest 20 in a desired location to support the driver of the motorcycle 12.

The frame preferably includes a pair of front legs 30 extending downwardly as best shown in FIGS. 1 through 4. The frame also preferably includes a pair of rear legs 40 extending downwardly and rearwardly at an acute angle with respect to the front legs 30 as further shown in FIGS. 1 through 4 of the drawings.

Figure 3:
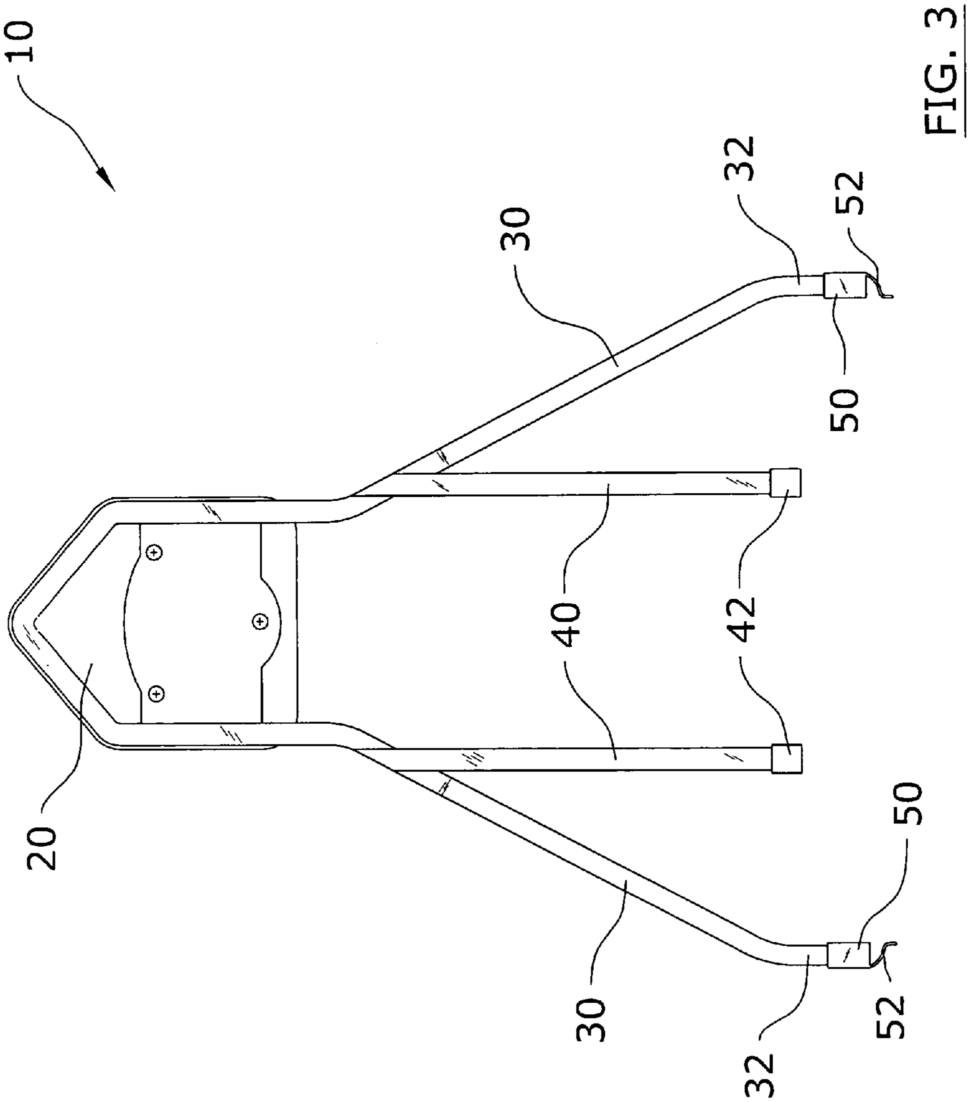
FIG. 3 is a rear view of the present invention.
Figure 5:
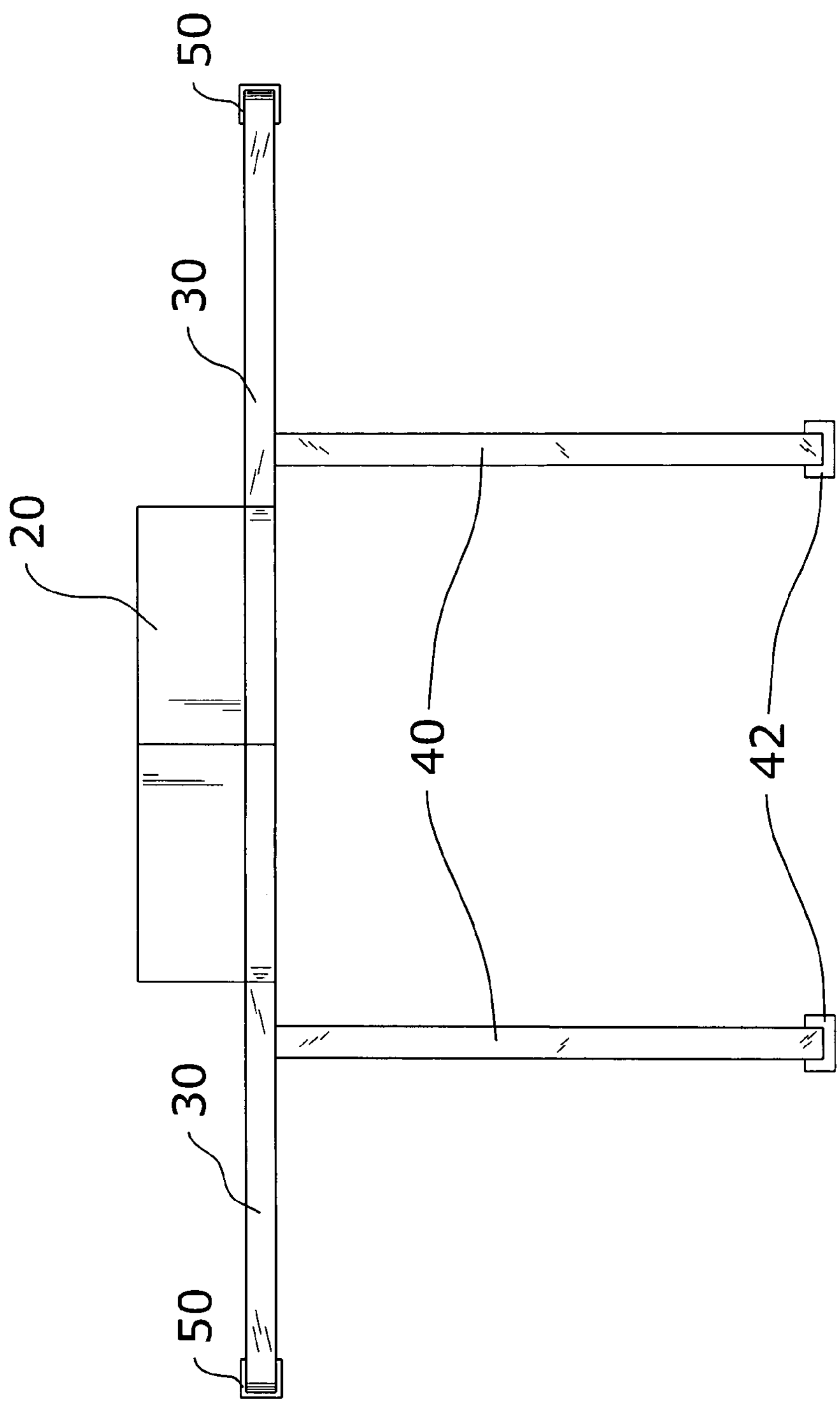
FIG. 5 is a top view of the present invention.
Figure 6:
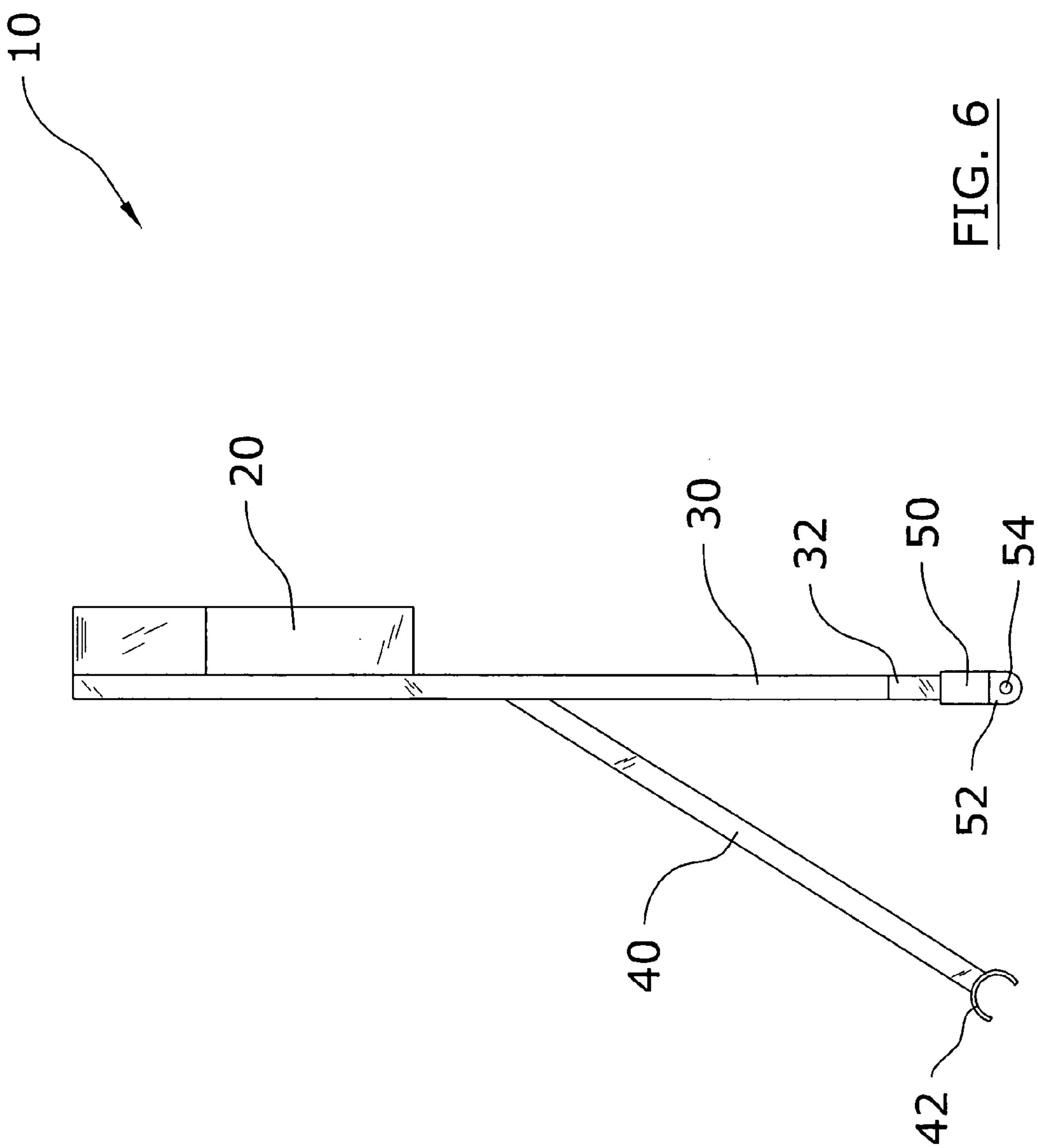
FIG. 6 is a side view of the present invention.
Figure 7:
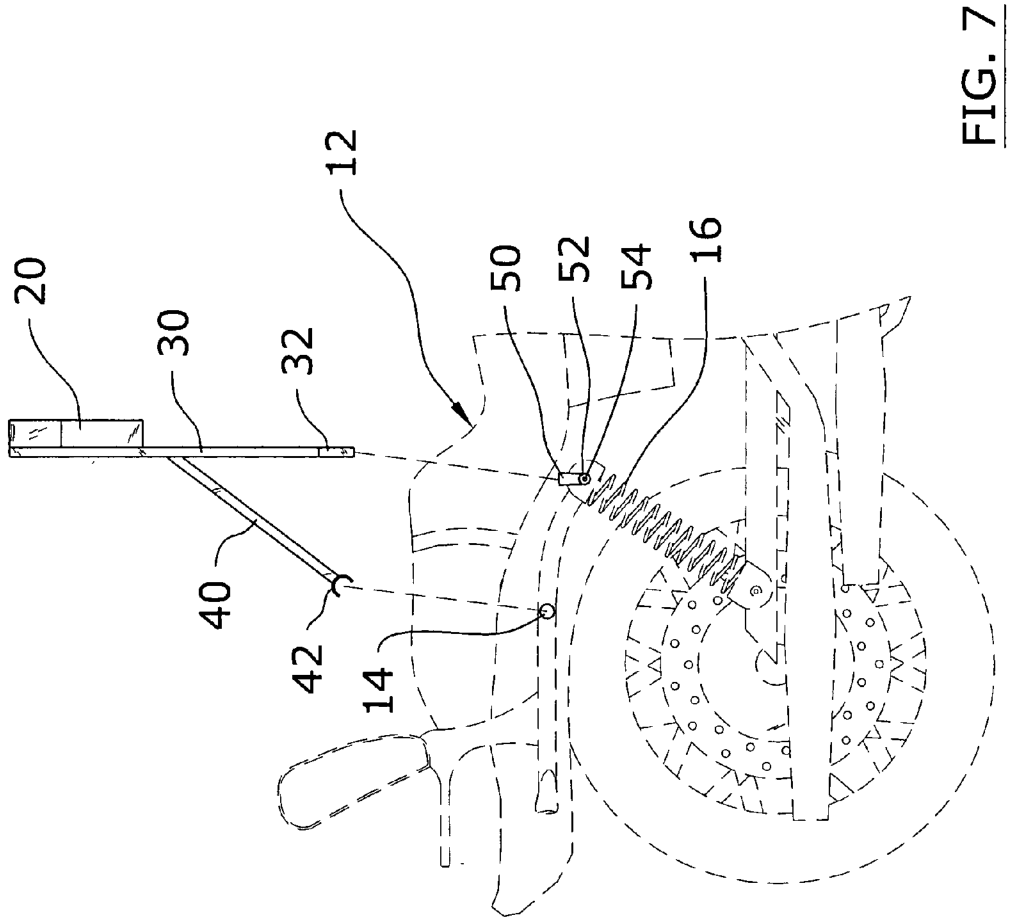
FIG. 7 is an exploded side view of the present invention with respect to a motorcycle.
Figure 8:
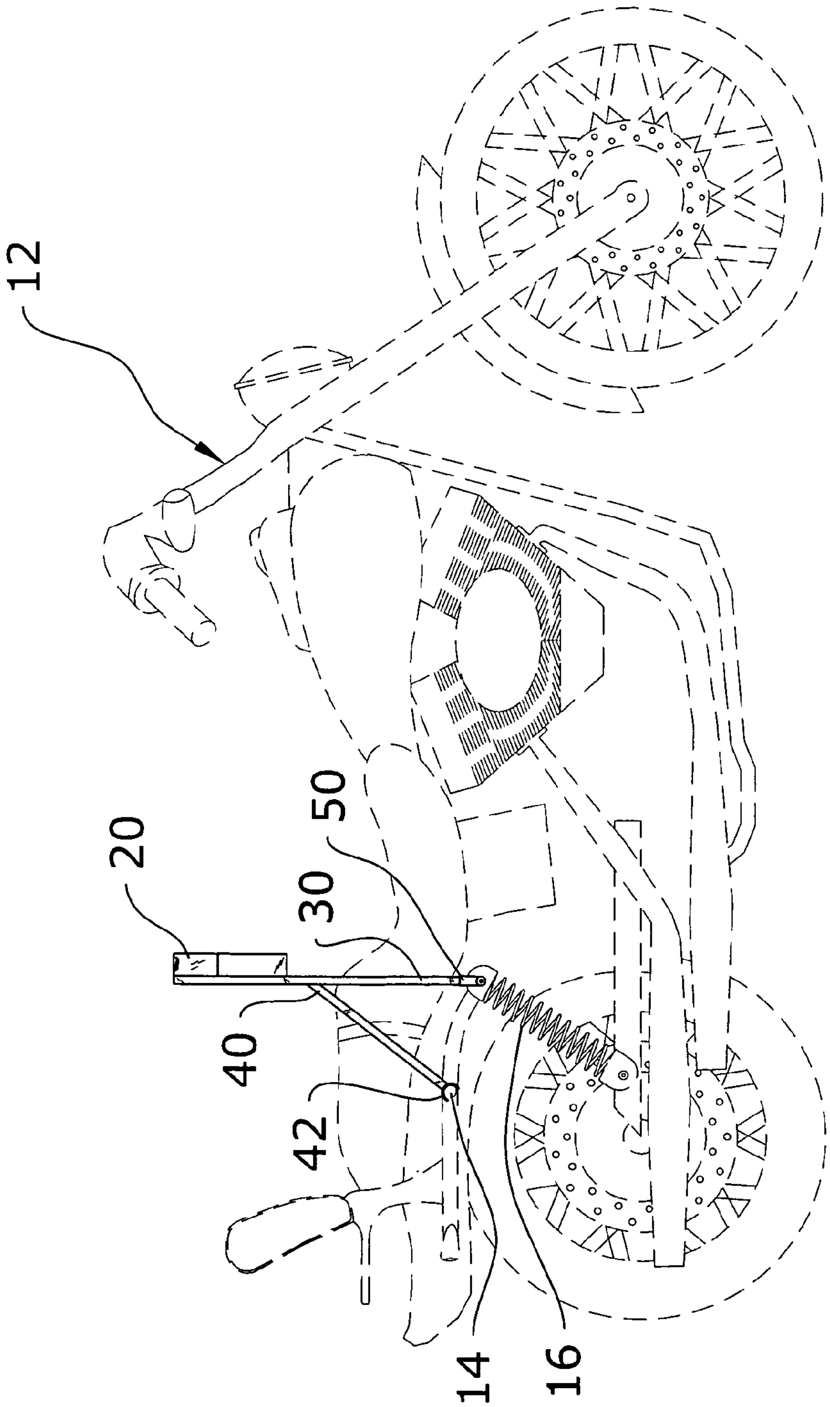
FIG. 8 is a side view of the present invention attached to a motorcycle.

The rear legs 40 are preferably substantially parallel to one another as best illustrated in FIGS. 3 and 5 of the drawings. The rear legs 40 preferably extend from the front legs 30 as best shown in FIGS. 3 and 6 of the drawings.

Figure 2:
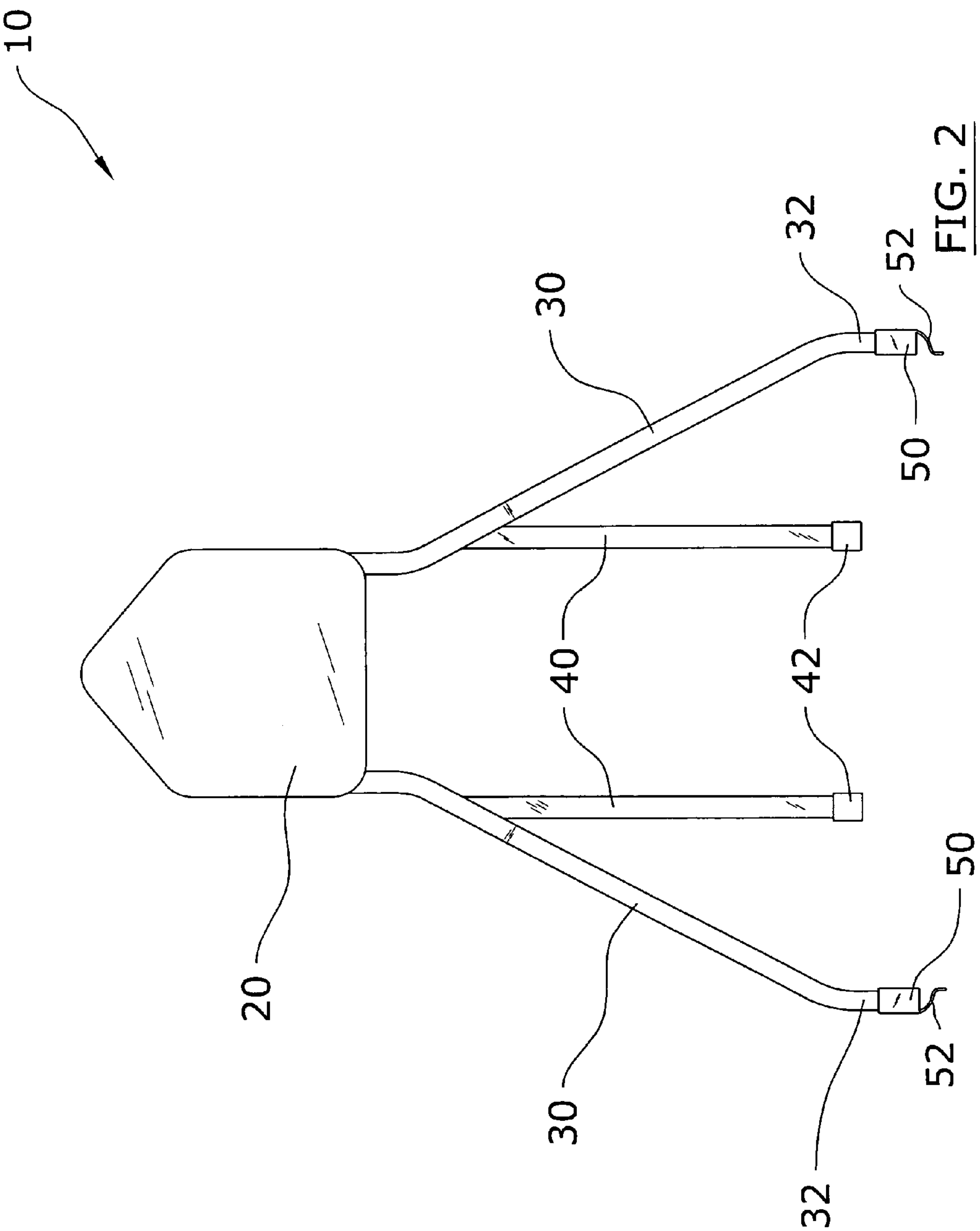
FIG. 2 is a front view of the present invention.
Figure 4:
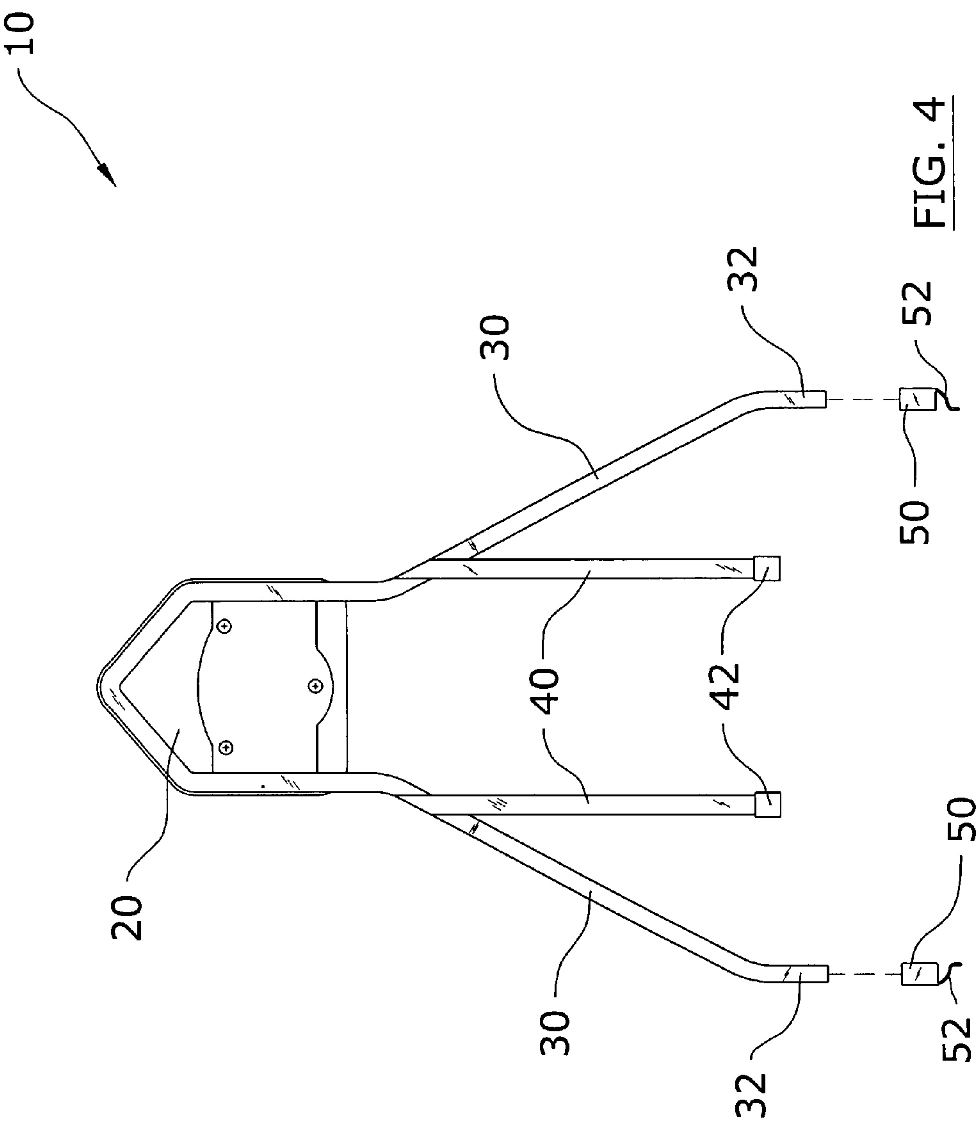
FIG. 4 is an exploded rear view of the present invention.

As shown in FIGS. 2, 3, 4 and 9 of the drawings, the front legs 30 preferably extend outwardly to accommodate the width of the shock assembly 16 for each side of the motorcycle 12. The front legs 30 also each preferably include a lower portion 32 that extends substantially downwardly. The lower portions 32 of the front legs 30 are preferably substantially parallel to one another as shown in FIGS. 2 through 4 of the drawings.

Figure 10:
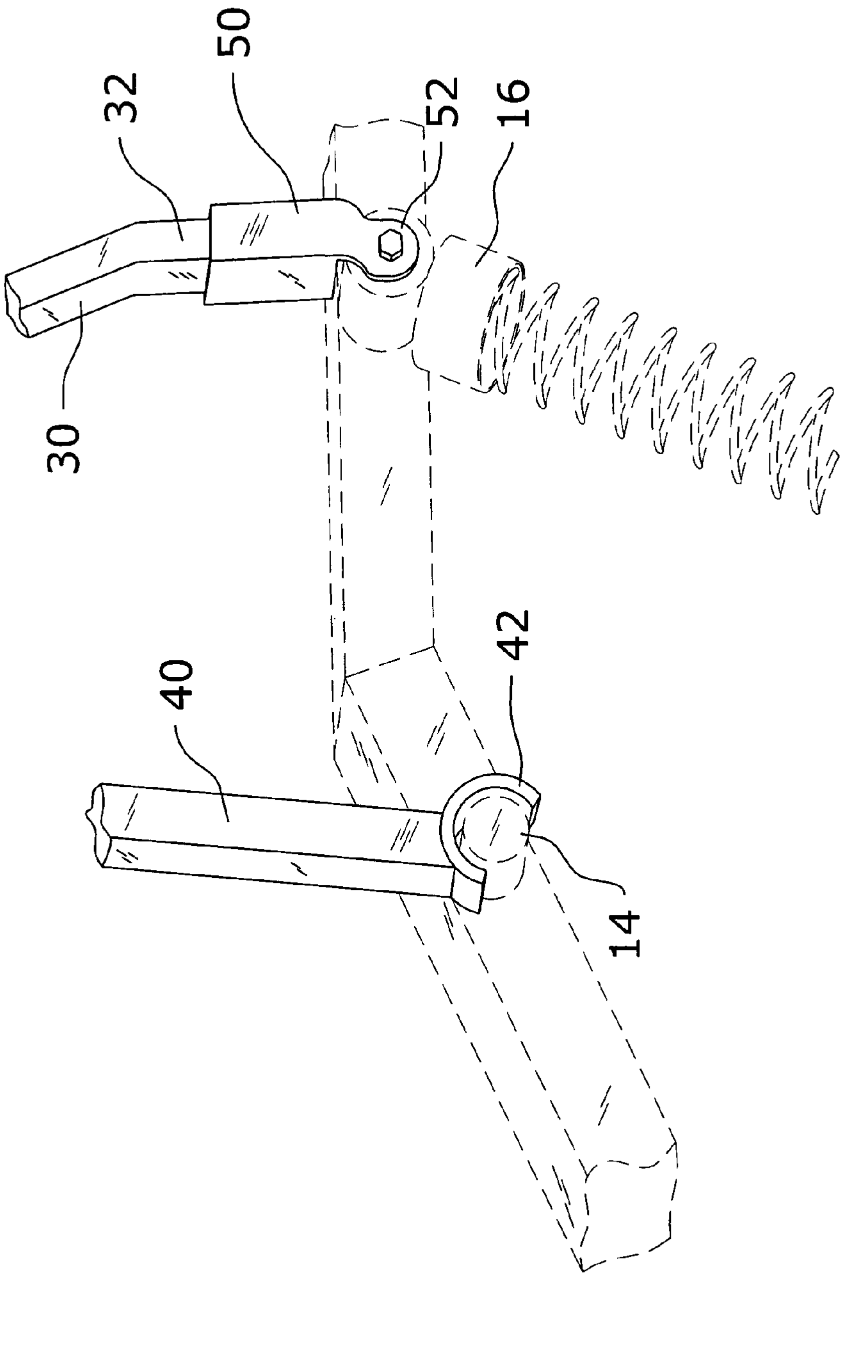
FIG. 10 is a magnified upper perspective view of the present invention attached to a motorcycle.
Figure 11:
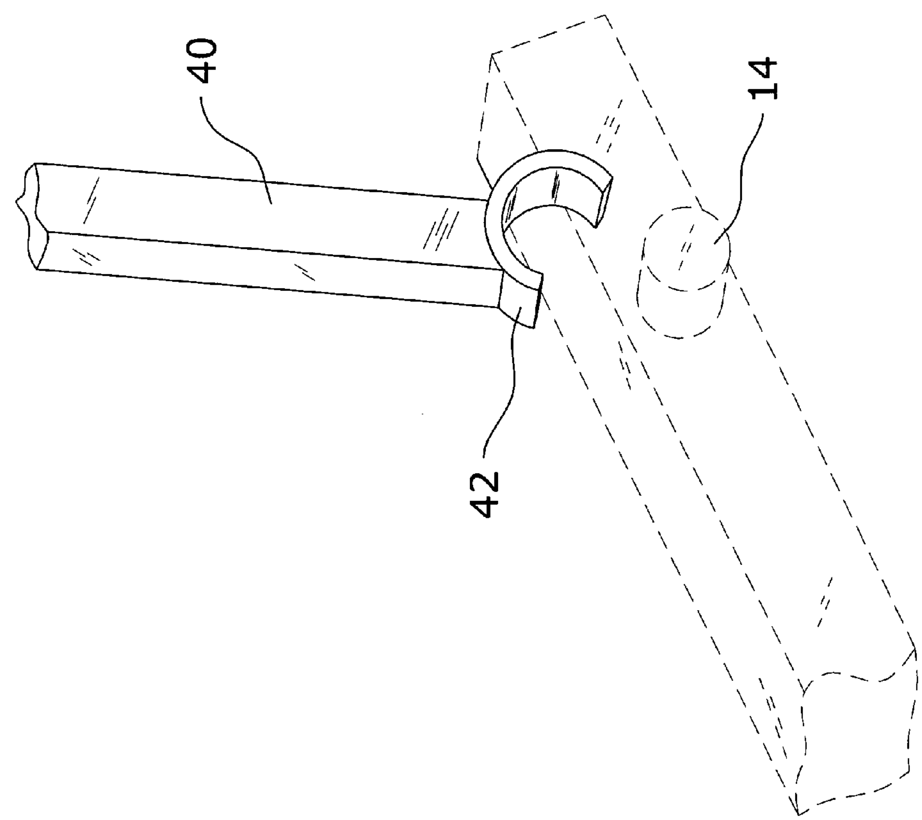
FIG. 11 is a magnified exploded upper perspective view of the rear leg with respect to the spacer member.

Each of the rear legs 40 includes an engaging end formed to catchably receive a corresponding pair of spacer members 14 attached to a motorcycle 12 as best shown in FIGS. 10 and 11 of the drawings. The engaging end is preferably comprised of a curved structure with an opening for receiving a spacer member 14 as further shown in FIGS. 10 and 11 of the drawings.

D. Receiver Member and Spacer Members

Figure 9:
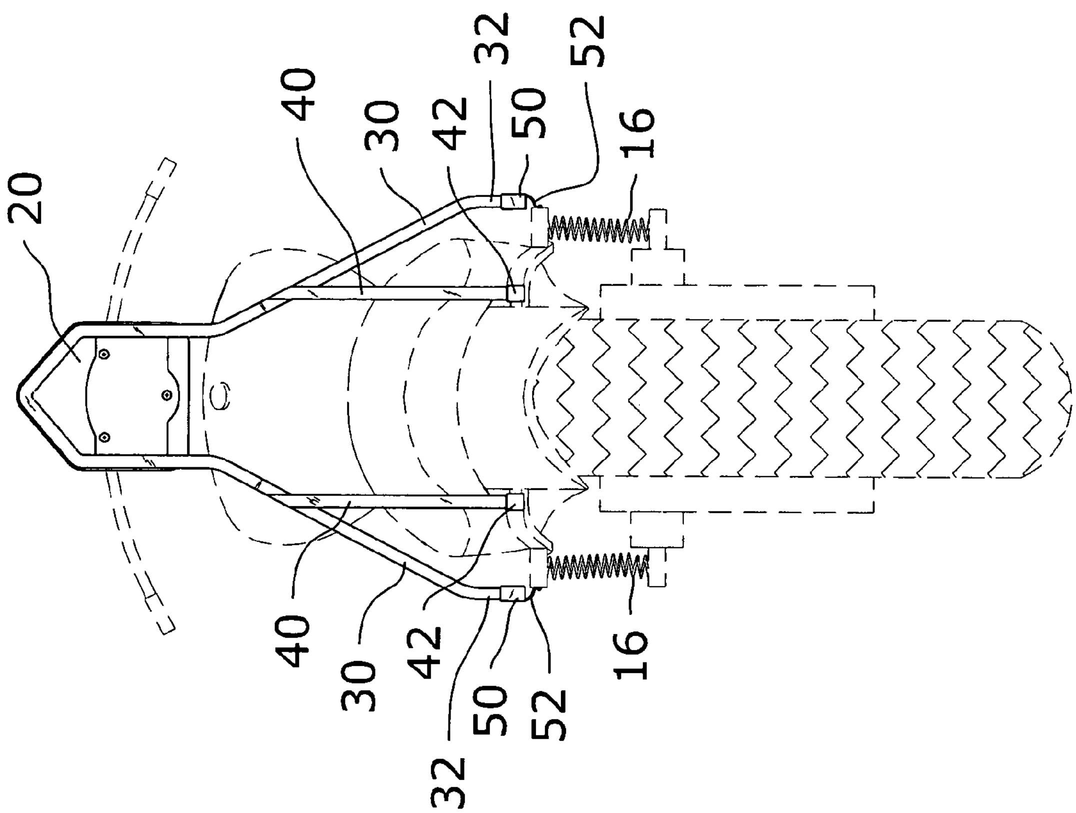
FIG. 9 is a rear view of the present invention attached to the motorcycle.

The pair of receiver members 50 are attachable to a motorcycle 12 as best shown in FIGS. 9 and 10 of the drawings. The receiver members 50 are preferably attachable to the upper end of each shock assembly 16 as shown in FIGS. 9 and 10 of the drawings. However, the receiver members 50 may be attached to other portions of the motorcycle 12 with minor modifications.

The receiver members 50 are preferably comprised of a tubular structure with an upper opening for removably receiving the lower ends of the front legs 30. It can be appreciated that the lower ends of the front legs 30 may have a tubular structure for slidably receiving the receiver members 50 alternatively.

The receiver members 50 each have an extended portion 52 with an aperture 54 as best illustrated in FIG. 6 of the drawings. The aperture 54 receives an upper threaded fastener of a shock assembly 16 as best illustrated in FIG. 10 of the drawings. In addition, the extended portion 52 is preferably angled to extend into an interior tubular portion of a shock assembly 16 as shown in FIG. 10 of the drawings.

The spacer members 14 are typically attached to a motorcycle 12 for supporting saddle bags and similar structures. The spacer members 14 are typically attached on opposing sides of the frame of the motorcycle 12 as shown in FIGS. 7 through 10 of the drawings. The spacer members 14 are comprised of a cylindrical structure with a circular outer cross sectional shape. If the motorcycle 12 does not have the spacer members 14 preinstalled, the user simply has to install the spacer members 14 upon the motorcycle 12 utilizing conventional fasteners.

E. Operation of Invention

In use, the user removes a fastener nut from an upper end of each shock assembly 16. The user then positions the aperture 54 of the receiver members 50 upon each of the threaded fasteners securing the upper end of the respective shock assembly 16. The user then secures each fastener nut upon the receiver members 50 with the receiver members 50 in a substantially vertical position.

The user then positions the lower end of the front legs 30 into the receiver members 50. After the front legs 30 are securely positioned within the receiver members 50, the user then tilts the present invention rearwardly until the engaging ends 42 of the rear legs 40 are positioned about the spacer members 14 as shown in FIG. 10 of the drawings. When the rider of the motorcycle 12 leans rearwardly against the backrest 20, the rear legs 40 prevent the pivoting of the frame or the backrest 20. When the user is finished operating the motorcycle 12 and/or wants to remove the backrest 20, they simply rotate the present invention forwardly and then lift upwardly to remove the front legs 30 from the receiver members 50.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

The invention claimed is:

1. A motorcycle backrest system, comprising:

a backrest;

a frame attached to and supporting said backrest, wherein said frame including a pair of front legs extending downwardly and a pair of rear legs extending downwardly and rearwardly at an angle with respect to said front legs, and wherein each of said rear legs includes an engaging end formed to catchably receive a corresponding pair of spacer members attached to a motorcycle; and a pair of receiver members attachable to a motorcycle, wherein said receiver members are comprised of a tubular structure with an upper opening for removably receiving the lower ends of said front legs;

wherein said receiver members each have an extended portion means with an aperture, wherein said aperture receives an upper threaded fastener of a shock assembly, wherein said extended portion means is angled to extend into a tubular portion of said shock assembly.

2. The motorcycle backrest system of claim 1, wherein said engaging end is comprised of a curved structure with an opening for receiving a spacer member.

3. The motorcycle backrest system of claim 1, wherein said rear legs are substantially parallel to one another.

4. The motorcycle backrest system of claim 1, wherein said angle is an acute angle.

5. The motorcycle backrest system of claim 1, wherein said rear legs extend from said front legs.

6. The motorcycle backrest system of claim 1, wherein said front legs extend outwardly.

7. The motorcycle backrest system of claim 6, wherein said front legs each include a lower portion that extends substantially downwardly.

8. A motorcycle backrest system, comprising:

a backrest;

a frame attached to and supporting said backrest, wherein said frame including a pair of front legs extending downwardly and a pair of rear legs extending downwardly and rearwardly at an acute angle with respect to said front legs, and wherein each of said rear legs includes an engaging end formed to catchably receive a corresponding pair of spacer members attached to a motorcycle;

wherein said engaging end is comprised of a curved structure with an opening for receiving a spacer member;

wherein said rear legs are substantially parallel to one another and wherein said rear legs extend from said front legs; and a pair of receiver members attachable to a motorcycle, wherein said receiver members are comprised of a tubular structure with an upper opening for removably receiving the lower ends of said front legs, wherein said receiver members each have an extended portion means with an aperture, wherein said aperture receives an upper threaded fastener of a shock assembly, and wherein said extended portion is angled to extend into a tubular portion of said shock assembly.

9. A motorcycle backrest system, comprising:

a backrest;

a pair of spacer members attachable to a motorcycle;

a frame attached to and supporting said backrest, wherein said frame including a pair of front legs extending downwardly and a pair of rear legs extending downwardly and rearwardly at an angle with respect to said front legs, and wherein each of said rear legs includes an engaging end formed to catchably receive said spacer members; and a pair of receiver members attachable to a motorcycle, wherein said receiver members are comprised of a tubular structure with an upper opening for removably receiving the lower ends of said front legs;

wherein an extended portion means is angled to extend into a tubular portion of a shock assembly.

10. The motorcycle backrest system of claim 9, wherein said engaging end is comprised of a curved structure with an opening for receiving a spacer member.

11. The motorcycle backrest system of claim 9, wherein said rear legs are substantially parallel to one another.

12. The motorcycle backrest system of claim 9, wherein said angle is an acute angle.

13. The motorcycle backrest system of claim 9, wherein said rear legs extend from said front legs.

14. The motorcycle backrest system of claim 9, wherein said front legs extend outwardly.

15. The motorcycle backrest system of claim 14, wherein said front legs each include a lower portion that extends substantially downwardly.

* * * * *